United States Patent [19]

Jones et al.

[11] Patent Number: 5,238,593

[45] Date of Patent: Aug. 24, 1993

[54] COMPOSITION AND METHOD FOR CLEANING GREENWARE AND WETTING EXPELLED SILICA DUST

[76] Inventors: Frances E. Jones, 1821 Daly St., Los Angeles, Calif. 90031; Gregory M. Jones, 1340 Paseo Gracia, San Dimas, Calif. 91773

[21] Appl. No.: 663,093

[22] Filed: Mar. 1, 1991

[51] Int. Cl.$^5$ .................. B05D 1/00; C04B 33/00; C09K 3/22

[52] U.S. Cl. .................. 252/88; 252/162; 427/154; 501/1; 501/141; 264/63; 264/DIG. 39

[58] Field of Search ......... 252/162, 170, 173, DIG. 8, 252/DIG. 10, DIG. 14, 88; 501/141, 1; 364/63, DIG. 39; 166/207.24; 427/154

[56] References Cited

U.S. PATENT DOCUMENTS

| | | | |
|---|---|---|---|
| 3,238,049 | 3/1966 | Somers | 501/141 |
| 3,436,278 | 4/1969 | Poliak | 106/287.24 |
| 3,880,662 | 4/1975 | Daskalon et al. | 501/141 |
| 4,013,594 | 3/1977 | Froehlich et al. | 252/88 |
| 4,018,858 | 4/1977 | Walters et al. | 264/63 |
| 4,141,945 | 2/1979 | Anderssen et al. | 264/63 |
| 4,464,293 | 8/1984 | Dobrin | 252/162 |
| 4,839,098 | 6/1989 | Wisotzki et al. | 252/153 |
| 5,041,235 | 8/1991 | Kilbarger | 252/170 |

OTHER PUBLICATIONS

*The Chemical Formulary*, H. Bennett ed., Chemical Publishing Co NY 1971 p. 154.

*Primary Examiner*—Prince Willis, Jr.
*Assistant Examiner*—J. Silbermann
*Attorney, Agent, or Firm*—Blakely, Sokoloff, Taylor, Zafman

[57] ABSTRACT

This present invention comprises a composition for cleaning unfired ceramic, porcelain and stoneware comprising a major amount of organic polar solvent, a small amount of glycerin and optionally minor amounts of dye and fragrance. The method of processing those materials without the risk associated with fine crystalline silica becoming air-borne is also described.

8 Claims, No Drawings

COMPOSITION AND METHOD FOR CLEANING GREENWARE AND WETTING EXPELLED SILICA DUST

BACKGROUND OF THE INVENTION

1. Field of the Invention

This invention relates to the fields of porcelain, ceramic and stoneware manufacturing and processing and more particularly to a cleaning composition and method for reducing fine silica dust from becoming air-borne during such processing.

2. Art Background

In the manufacture of porcelain, ceramic and stoneware products, a slurry is poured into a mold, and thereafter allowed to dry. The dried product, often termed "greenware" is then further processed or cleaned wherein it is smoothed and shaped. During this smoothing and shaping process, dust from the dried slurry escaped in the air. This dust includes powdered silica. Porcelain contains about 20% silica, and 3 to 5% of the porcelain is fine crystalline silica, a material which has been recognized as being dangerous. The other materials also contain significant amounts of fine crystalline silica as well.

Specifically, particles of crystalline silica, often called fine crystalline silica which are airborne and less than 3.5 microns are considered to be dangerous. Particles greater than 3.5 microns are considered only a nuisance since they can be naturally expelled from the lungs. Those particles which are in the range of 3.5 microns down to 1 micron may be inhaled and may become lodged in the lungs. They are too small to be evacuated by coughing, so they remain on the surface of the lung cells and cause scar tissue to form thereover, resulting in silicosis, a form of a disabling, progressive and sometimes fatal pulmonary fibrosis characterized by the presence of nodulation in the lungs. Particles less than 1 micron in size pass through the lungs and into the bloodstream, and eventually settles in the eye, resulting in impaired vision and eventually blindness.

OSHA has recognized the hazards of fine crystalline silica and has promulgated regulations relating to fine crystalline silica in September, 1978. However, OSHA regulations only apply to commercial establishments employing 10 employees or more. On the other hand, much of the porcelain, and a significant amount of the stoneware and ceramic work in this country is performed by hobbyists and by small establishments of fewer than 10 employees, thereby rendering the OSHA requirements moot for the majority of craftspersons in the field. In any event, as explained more fully below, no effective prior art method has heretofore been established which does not have serious drawbacks.

Standard filtration is only effective for particles 10 microns or greater and therefore offers no solution to the problems of fine crystalline silica described hereinabove. Electrostatic precipitators which charge airborne particles permitting them to agglomerate and precipitate into filters are minimally effective; however, the filters must be cleaned almost hourly in order to maintain their effectiveness. Further, they create a substantial amount of ozone which is believed to have critical effects on the health and safety of individuals, particularly in a closed room. The use of exhaust fans to exhaust the silica dust outside the facility may be effective, but it is only transferring the problem from inside the room to the exterior, and may face additional air quality control problems.

One solution which has been developed is to perform the greenware cleaning under water. The particles remain wet and do not become airborne. However, greenware cannot be wetted with aqueous solutions without damage thereto. Specifically, the wetted surface becomes glassy and fails to take up paint properly if the greenware is porcelain, and if melts is it is ceramic or stoneware. Therefore, under this prior art process, cleaning and scraping is performed on the ceramic after it is fired at a relatively low temperature for a short time, causing partial vitrification of the porcelain, ceramic or stoneware piece.

There are several drawbacks to this process however. First, the firing of the porcelain, ceramic or stoneware piece requires an extra firing step which is expensive and time consuming. Second, detail of the piece may be lost due to the increased difficulty in working with a partially vitrified piece. Additionally, the piece is more difficult to clean and it takes longer to clean, since the cleaning actually occurs while the piece is partially or fully submerged, and working under water is difficult. It is also messy since the water can splash or spill. Further, since the piece is partially fired, breaks and cracks cannot be repaired like they can when greenware is cleaned prior to firing.

Some craftspersons have used glycerin on the surface of greenware to minimize the escape of dust into the air. The use of glycerin, however, makes cleaning the greenware very difficult and in many cases, doesn't work at all. Most craftspersons believe that you cannot put any liquids on unfired porcelain without ruining the piece.

The present invention overcomes the deficiencies of methods of the prior art and provides a composition and method which makes the cleaning of greenware easier, faster, safer and more versatile than all of the prior art methods.

SUMMARY OF THE INVENTION

The present invention comprises a composition and method for cleaning greenware and preventing silica dust, particularly dangerous silica dust having a particle size of less than 3.5 microns (fine crystalline silica) from becoming airborne, thereby preventing the dust from getting into the lungs, the bloodstream and possibly settling in the eyes.

The composition of the present invention comprises primarily anhydrous alcohol, a small amount of glycerin, a small amount of an oil based fragrance and an organic based color additive. More particularly, the composition comprises anhydrous isopropyl alcohol, Belmay ® citrus fragrance (#48198-490) (0.5 ml per gallon), glycerin (1.0 ml per gallon) and phthalocyanin dye dissolved in isopropyl alcohol (anhydrous) in sufficient concentration to color the solution.

The isopropyl wets the silica dust to prevent it from becoming airborne and also makes the ceramic material workable. The glycerin softens the greenware and holds the silica dust on the surface of the greenware. The fragrance lets the user know when the composition is being used. This is important since the isopropyl alcohol is relatively flammable, and it is important to identify any flammability hazards, by scent if possible. The dye is found to be useful in helping the ceramic craftsperson identify what portions of the ceramic have been cleaned. The dye which is used leaves no residual color after firing the ceramic piece.

The composition is used both as a wetting agent to prevent the scrapings from greenware becoming airborne. In this capacity, it also wets and slightly softens the greenware making it easy to work the ceramic material. It also permits the easy repair of cracks and breaks by permitting the ceramic craftsperson to move and work with the ceramic material. The composition is also used as a washing agent to remove any loose material and residue. The silica particles remain in a bath of the composition after they are washed off and settle to the bottom thereby allowing the solution to be decanted and reused.

Specifically, in use, a portion of the unfired greenware is wetted with the solution of the present invention by applying the solution thereto with a cotton ball, brush, rag, spray or the like. Only a small portion is wetted at one time. The craftsperson may then clean, carve and/or polish that area. The area which has silica dust will have a white dust residue which will appear as the composition dries off the piece. A brush wet with the composition is then used to rinse off the piece and the brush is then rinsed in a container of the solution. The silica particles then settle to the bottom of the solution, allowing the user to separate the solution from the particles and reuse the solution. Once the porcelain piece is dry, in approximately 1 hour, it can be fired as is known in the art without any residual effects from the invented composition.

It is an object of the present invention to provide a composition for cleaning greenware.

It is another object of the present invention to provide a composition which permits the repair of greenware.

It is another object of the present invention to provide a composition which facilitates the carving of greenware.

It is another object of the present invention to provide a composition which makes it easier to clean greenware than is presently known in the art.

It is another object of the present invention to provide a method for cleaning greenware which eliminates or minimizes the risks caused by silica dust.

It is yet another object of the present invention to provide a method and composition which facilitates providing a smoother finish for porcelain, ceramic and stoneware articles.

It is yet another object of the present invention to provide a method of cleaning greenware which is easier, faster, less expensive and neater than prior art methods.

This and other objects of the present invention will be found in from the description of the invention set forth in detail below.

DETAILED DESCRIPTION OF THE INVENTION

The composition of the present invention comprises the following ingredients:
anhydrous polar organic solvent; and
glycerin.

Additionally the following ingredients may be employed:
oil based fragrance;
organic based dye.

The anhydrous polar organic solvent is the primary component of the invention comprising almost the entire amount of the composition. The anhydrous polar organic solvent is preferably anhydrous (99.97%) isopropyl alcohol, although other anhydrous alcohols, such as ethanol or methanol may be used. Additionally trichloroethylene may be used. A typical formulation of 1 gallon of the composition of the present invention contains approximately 1 gallon of the anhydrous polar organic solvent.

Glycerin is added to improve the softening ability of the solution making it easier to carve the porcelain. It also causes the porcelain dust to adhere to the surface of the porcelain piece. It also prevents the composition from drying too quickly. Only a small amount of glycerin is required, in the range of 0.25 to 10.0, and preferably 1.0, milliliters per gallon of composition. Providing too much glycerin causes the greenware piece to melt. Providing insufficient glycerin makes it more difficult to carve and clean the porcelain piece. Preferably relatively pure (99.5%) glycerin is used.

The fragrance is used to make the solution detectable and to retard the drying of the composition. Its elimination from the composition does not appear to cause any detrimental effects relating to the characteristics of the composition and its effect on the greenware and dust control, other than the composition drying more quickly. The fragrance preferably is Belmay West ® Citrus Fragrance No. 48198-490, a proprietary composition, although other fragrances which are not excessively water based may be used since excessive water content in the solution causes blotching of the porcelain after firing. Preferably the concentration of the fragrance in the composition of the present invention is about 0.5 milliliters per gallon, although a range of 0 to 2.0 milliliters may be used. Several other fragrances have also proved acceptable for use in the present invention including Belmay ® Cleaner Fragrance #47920-490, Fresh & Clean #48200-490, Cleaner Fragrance #47921-490, Fresh Floral Fragrance #48202-490, Mint Fragrance #48199-490, Fresh Floral Fragrance #48203-490, Clean Fragrance #48201-490; and Filton Worldwide Honeysuckle Floral Fragrance E#0385, Raspberry Fragrance E#0384, and Unscented Fragrance E#0386.

The other optional ingredient of the present invention is dye which permits the user to see where on the porcelain piece the composition has been applied. Various organic based dyes may be used. The presently preferred dye is a phthalocyanin dye called Solvent Blue 38 commercially available from Keystone Aniline Corp., Santa Fe Springs, Calif. The dye of the preferred embodiment is made by dissolving 10 teaspoons of the dye in one gallon of anhydrous isopropyl alcohol. It is then filtered and strained. Twelve (12) milliliters of the dye solution is then used in a gallon of the composition of the present invention in the preferred embodiment.

The subject composition is used in the cleaning and carving of porcelain, ceramic and stoneware which is termed greenware for purposes of this invention. Only unfired greenware should be used in conjunction with the present invention. Two spill resistant containers should be used to hold the subject composition, one for cleaning and the other for the final clean rinse of the greenware. Only a small area of the greenware should be worked at any one time. This avoids waste as the composition dries, and prevents the greenware from becoming too heavy.

In the preferred embodiment, a cotton ball is used to apply the composition, although clean rags, brushes and sprays or other application means may be used. The seams should be rubbed with the cotton ball soaked in the solution, and the same cotton ball can be used to polish the surface of the greenware. The area being worked should be kept shiny with the composition. Cleaning and polishing of the greenware is performed as is known in the art.

To facilitate carving, the area to be carved should be dampened with the subject composition. Carving is then performed on the greenware as is known in the art. The first container should be used as the source for the composition for all of the foregoing steps.

After the carving, polishing and cleaning are completed, the clean container of the composition is used to rinse all remaining dust off the greenware. In the preferred embodiment, this step is performed with a china mop, which is a soft brush, soaked in the composition from the second container. The mop is used to mop off the greenware, and the dust thereon is preferably not brushed. The mop is then rinsed often to keep it clean. As the wet shine on the greenware disappears, any dust residue appears as a white dust. When completely clean, the greenware will have a grey wet appearance with faint white streaks, and no white dust residue on the surface. Small crevices and tight areas are cleaned with a small brush soaked in the subject solution.

The greenware should be dried for at least 1 hour prior to firing. The solution of the subject composition may be recycled by allowing the dust and other residue to settle in the solution, preferably overnight, and then decanting off the solution without the settled particles. The particles should then be disposed while still wet to avoid complete drying and the particles becoming air-borne.

It will be obvious to a person of ordinary skill in the art that many changes and modifications can be made to the above-described system which will fall within the spirit and scope of the invention as set forth in the appended claims.

What is claimed is:

1. A method of processing greenware without causing silica dust to become air-borne comprising the steps of:

applying to unfired greenware an anhydrous composition comprising for a gallon of said composition:
approximately one gallon of anhydrous polar organic solvent and approximately 0.25 to 10.0 milliliters per gallon of glycerin in a concentration sufficiently small so that it does not melt the greenware, wherein said composition is substantially free of water;

cleaning, carving and polishing said greenware;

rinsing said greenware with said composition;

examining said greenware to remove any white dust residue and removing said dust from said greenware by rinsing with said composition;

allowing said greenware to dry; and firing said greenware.

2. The method of claim 1 wherein said anhydrous polar organic solvent is selected from anhydrous isopropyl, methanol, ethanol and trichloroethylene.

3. The method of claim 1 wherein said glycerin is supplied in a concentration 1.0 milliliter per gallon.

4. The method of claim 1 wherein said composition is further comprised of 0.5 to 2.0 milliliters of an oil based fragrance per gallon of composition.

5. The method of claim 1 wherein said composition is further comprised of a dye.

6. A method of processing greenware without causing silica dust to become air-borne comprising the steps of:

applying to unfired greenware an anhydrous composition comprising in approximately a gallon of said composition:
a gallon of anhydrous polar organic solvent selected from anhydrous isopropyl alcohol, methanol, ethanol and trichloroethylene;
glycerin in a concentration of about 0.25 to 10.0 milliliters per gallon;
approximately 10 milliliters of organic dye; and
0.25 to 0.50 milliliters of oil based fragrance in minor amount;

cleaning, carving and polishing said greenware;

rinsing said greenware with said composition;

examining said greenware to remove any white dust residue and removing said dust from said greenware by rinsing with said composition;

allowing said greenware to dry; and firing said greenware.

7. The method of claim 6 wherein said solvent is anhydrous isopropyl alcohol.

8. The method of claim 7 wherein said dye is phthalocyanin dye dissolved in anhydrous isopropyl alcohol.

* * * * *

UNITED STATES PATENT AND TRADEMARK OFFICE
CERTIFICATE OF CORRECTION

PATENT NO. : 5,238,593
DATED : August 24, 1993
INVENTOR(S) : Jones et al.

It is certified that error appears in the above-identified patent and that said Letters Patent is hereby corrected as shown below:

On the title page, item [54] and column 1 at lines 1-3, please delete " COMPOSITION AND METHOD FOR CLEANING GREENWARE AND WETTING EXPELLED SILICA DUST " and insert -- METHOD FOR CONTROLLING SILICA DUST IN GREENWARE PROCESSING --.

Signed and Sealed this

First Day of July, 1997

*Attest:*

BRUCE LEHMAN

*Attesting Officer*          *Commissioner of Patents and Trademarks*